United States Patent [19]

Collins

[11] Patent Number: 4,554,671

[45] Date of Patent: Nov. 19, 1985

[54] DELTA MODULATED COMMUNICATION SYSTEM

[75] Inventor: Galen R. Collins, San Jose, Calif.

[73] Assignee: Fuji Photo Film Co., Ltd., Kanagawa, Japan

[21] Appl. No.: 548,804

[22] Filed: Nov. 4, 1983

[51] Int. Cl.[4] .............................................. H03K 13/22
[52] U.S. Cl. .................................... 375/30; 332/11 D
[58] Field of Search ........................ 375/27, 30, 31, 32; 332/11 D; 358/135; 340/347 AD

[56] References Cited

U.S. PATENT DOCUMENTS

| | | | |
|---|---|---|---|
| 3,414,818 | 12/1968 | Reidel | 375/32 |
| 3,497,624 | 2/1970 | Brolin | 375/22 |
| 3,500,441 | 3/1970 | Brolin | 375/32 |
| 3,806,806 | 4/1974 | Brolin | 375/30 |
| 4,438,523 | 3/1984 | Brandl | 375/30 |

Primary Examiner—Robert L. Griffin
Assistant Examiner—Stephen Chin
Attorney, Agent, or Firm—Sughrue, Mion, Zinn, Macpeak & Seas

[57] ABSTRACT

A logarithmic delta modulated transmission system, comprising a logarithmic A/D converter (12) for outputting binary signals (16, 18) indicative of the polarity and size of the difference between an analog signal to be transmitted and a reconstructed signal (44), selection circuitry (22, 38) for sampling the polarity signal at a clock rate (20) and the size signals at a subharmonic (26, 34) of the clock rate, and outputting digital signals to be transmitted, and a logarithmic delta demodulator (42) for providing the reconstructed signal from the transmitted signals. The sizes of the difference are set to be logarithmic.

8 Claims, 5 Drawing Figures

DELTA MODULATED COMMUNICATION SYSTEM

BACKGROUND OF THE INVENTION

This invention relates generally to digital communication systems and particularly to a delta modulated communication system that transmits step sizes.

Digital communication systems are finding increasing use for the transmission of analog signals, such as voice communication. The design of such systems involves a tradeoff between the fidelity of reproduction of the analog signal and the bandwidth required. Various techniques are used for the encoding of the analog data, some of which are very simple and others of which attempt to attain high fidelity at relatively low bandwidth.

One of the simplest systems is a pulse code modulated (PCM) communication system. In a linear PCM system, the analog signal is periodically sampled in a linear analog-to-digital (A/D) converter. The digital amplitude of the instantaneous analog signal is then transmitted as a binary pulse train. PCM communication systems suffer from several problems. If the analog signal has a large dynamic range, the number of bits required to adequately represent this range is correspondingly large and requires a large bandwidth for transmission. Furthermore, the linear A/D converters are required to operate accurately over the entire dynamic range. Such A/D converters are difficult to build and are expensive.

A logarithmic PCM system uses a logarithmic A/D converter in which the levels are quantized in a logarithmic scale. Logarithmic A/D converters with large dynamic range are inexpensive and the bandwidth required for logarithmic PCM is less than for linear PCM. However, some fidelity is sacrificed by the logarithmic compression.

An alternative to standard PCM is differential logarithmic PCM, in which the amplitude of the analog signal is not itself transmitted. Instead, the transmitter, in sampling the analog signal each sampling period, compares the sampled signal against the next previously sampled signal. A logarithmic difference of these two values is then transmitted. The receiver must then integrate the differential PCM signals to obtain the instantaneous digital amplitudes. Although differential PCM is more complex than standard PCM, it offers high fidelity in the presence of low frequency noise.

A completely different approach is used in the delta modulation (DM) technique. In DM systems, just like a differential PCM system, the transmitter transmits a differential of the amplitude of the analog signal rather than the amplitude itself. But unlike the differential PCM, a DM system can transmit only one of two signals, a positive step or a negative step, each of the same magnitude. A positive step would be transmitted as a 1, a negative step as 0. In the simplest DM systems, the size of the step remains constant with the result that if the analog signal is rapidly varying, the digital transmitted signal will not accurately reproduce sudden changes exceeding the size of the step. One result of this effect is that the transmitter does not compare the present value of the analog signal with its value in the previous sampling. But instead, it compares the sampled value against the value indicated by the previous digital transmissions. Eventually, after a series of steps in the same direction following a sudden change, the indicated value again returns to the neighborhood of the sampled value. The operational effect of this lag is that delta modulation poorly transmits or distorts high frequency, high amplitude analog signals.

There have been several techniques suggested which would provide for adaptive delta modulation, i.e. the size of the step is automatically altered at both the transmitting and receiving stations depending on the immediate past history of the delta modulated transmission. For example, if three successive transmitted bits are ones, it can be surmised that the transmitter is overloading and the digital signal is lagging the analog signal. If this occurs, both transmitter and receiver will assume a step size that is double the previous step size so that larger changes in the analog signal can be accommodated. Likewise, if three zeroes in a row are received, it can be assumed that the transmitter is also overloaded with a negative going analog signal and likewise the step size is doubled. On the other hand, if a train of alternating ones and zeroes is transmitted, it can be assumed that the step size is too large for the relatively small changes occurring in the analog signal. Therefore the step size is set at half of its previous value. Techniques such as these are described by Donald L. Schilling et al. in *IEEE Transactions on Communications*, volume COM-26, 1978, pages 1652-1659. These techniques tend to require complicated electronics to implement the algorithms necessary for the corrections of the step size.

SUMMARY OF THE INVENTION

Accordingly, it is an object of this invention to provide a digital transmission system for audio signals that provides high fidelity.

It is a further object of this invention to provide a digital communication system for analog signals that use simple and inexpensive components.

The invention is a digital communication system for an analog signal, especially an audio signal, that transmits a delta modulated (DM) signal. After a given number of DM bits is transmitted, the transmitter as well transmits a new step size. This step size is determined by a logarithmic A/D converter which compares the analog signal against the current value of the digitally encoded signal. Being a logarithmic A/D, the step sizes are larger as the difference between the sampled analog signal and the digital signal increases. The output of the logarithmic A/D which is transmitted is the digital number of the corrected step size, which is used as the step size for a given number of DM bit transmissions.

DETAILED DESCRIPTION OF THE PREFERRED EMBODIMENTS

Figure 1:
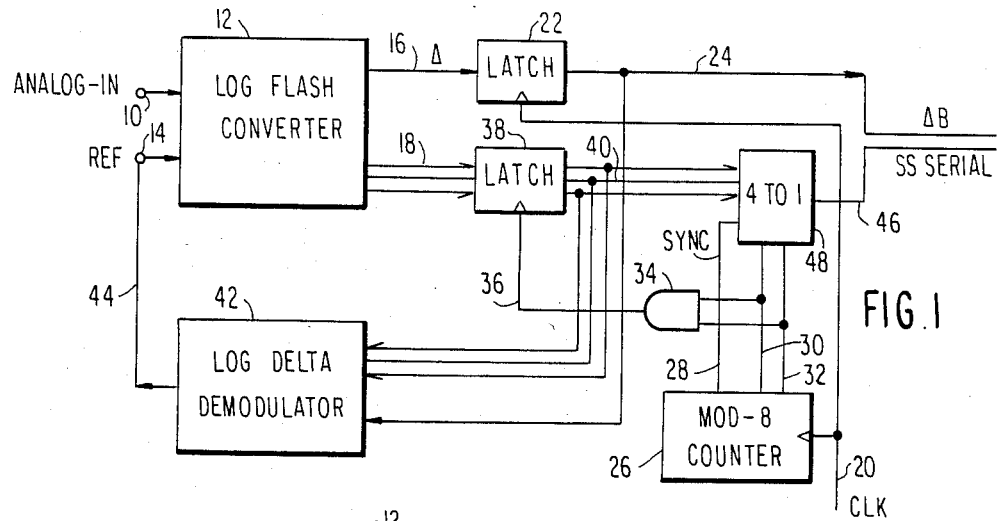
FIG. 1 is a block diagram of an embodiment of a delta modulated transmitting station of the present invention.

One embodiment of the present invention is shown in block diagram form in FIG. 1. An analog signal to be transmitted is connected to an analog input terminal 10 of a logarithmic flash converter 12 which compares the analog signal against a reference signal input on the other input terminal 14 of the comparator 12. This reference signal, to be described later, is the value of the analog signal which is indicated by the output of the communication system and which may be lagging the analog input signal if this signal is rapidly changing. The log flash converter 12, to be described in more detail later, produces two types of outputs. A delta output 16 is a single line output corresponding to the output of a simple comparator, i.e. the output is one if the analog input signal is larger than the reference signal, and is zero if the analog input signal is smaller than the reference signal. A step-size output 18 of the converter 12 is a digital output that is determined by magnitude of the difference between the analog input signal and the reference signal. In this example, the step-size output comprises three parallel data lines but it is to be understood that the invention is not limited to such a number. Three binary data lines on the step size output 18 imply that there may be a total of eight bins into which the magnitude of the difference of the analog input signal and the reference signal may be resolved. The logarithmic converter 12 is further distinguished in that the size of these bins is logarithmically increasing, that is to say that the first bin indicating the smallest difference between the two input signals is only half the size of the second bin. Likewise, the third bin is twice the size of the second bin and the fourth bin is twice the size of the third bin. This is a specific case of a companding converter in which the higher numbered bins are wider than the lower numbered bins. Other types of companding A/D converters can be advantageously used with this invention.

Although the signals 16 and 18 output from the converter 12 are in digital form for the logarithmic flash converter 12 to be described later these binary signals appearing on the outputs 16 and 18 are not proper digital signals because they are not clocked. A system clock, not shown, provides a clock signal 20 which determines the data transmission rate of this system. A one-bit latch 22 driven by the clock signal 20 receives at its input the delta signal 16 and once each clock period outputs, on the delta transmission line 24, a transmitted delta signal. The latch 22 therefore operates to sample the delta signal on the delta output 16.

The clock signal 20 also drives a modulo-8 counter 26 that has three digital output lines 28, 30 and 32. The output lines carry the binary representation of the number of clock periods currently input to the counter 26. Being a modulo-8 counter, the values repeat every eight clock cycles. The two lower ordered output lines 30 and 32 are connected to an AND-gate 34 which produces a positive output as a step clock signal once every four cycles of the clock. As a result, the step clock is running at one quarter the rate of the clock and the step clock rate is a subharmonic of the clock rate. A three-bit wide latch 38, driven by the step clock signal, receives at its input the step size signals and once every cycle of the step clock outputs on a parallel step size transmission line 40 a parallel transmitted step size signal.

As mentioned previously, a reference signal must be provided to the input 14 of the converter 12 which is the analog signal corresponding to the signal predicted by the digital signal on the delta transmission lines 24 and step size signal lines 40. The effect is to have a local receiver that behaves just like the receiver receiving the transmitted signal so that the converter 12 knows by how much the transmitted signal lags or differs from the analog input signal 10. This function is performed by a logarithmic delta demodulator 42 which receives as inputs both the delta transmission line 24 and the step size transmission lines 40. The domodulator takes these signals and, in a process to be described in greater detail later, first creates an analog voltage indicative of the current step size and having the sign of the current delta signal. This analog voltage is then integrated with previously derived values to produce on its output 44 an analog voltage corresponding to the analog input signal 10 but perhaps differing from it by the nature of a DM system. By the nature of DM communication systems, a signal transmitted in digital form may differ from the analog input signal both because of quantization noise and the inability of DM systems to follow a rapidly changing analog input signal. These inaccuracies will accurately be included in the output 44 of the logarithmic delta demodulator which is connected to the reference input 14 of the converter 12.

The operation of the delta modulated communication system of the present invention can be improved if the transmitted step-size signal is multiplexed onto a single step size serial line 46. This is accomplished by connecting the step-size transmission line 40 to three of the four inputs of a 4 to 1 switch 48, also called a multiplexer. The step-size serial line is connected to the output of this switch 48. Connected to the fourth input of the switch 48 is the high order output line 28 from the counter 26. The low order output lines 30 and 32 are used to control the switching so that once every four clock cycles each of the inputs 40 or 28 of the switch is connected to the step size serial line which is being clocked at the same rate as the delta transmission line 24. The high order line 28 is being used to provide a synchronization signal on the step size serial line. Every fourth cycle, the signal on the high order line 28 changes from a zero to a one or vice versa. By the use of apparatus to be described with the receiving station, this sync bit can be used to maintain the transmitting and receiving stations in synchronization even when they are not connected to a common clock or even when the clocks fractionally differ. It is of course possible to multiplex together the delta transmission signal and the step size serial signal by methods similar to those already described. Of course the resulting single channel would need to operate at twice the clock rate to transmit the interleaved delta and step size data.

Figure 2:
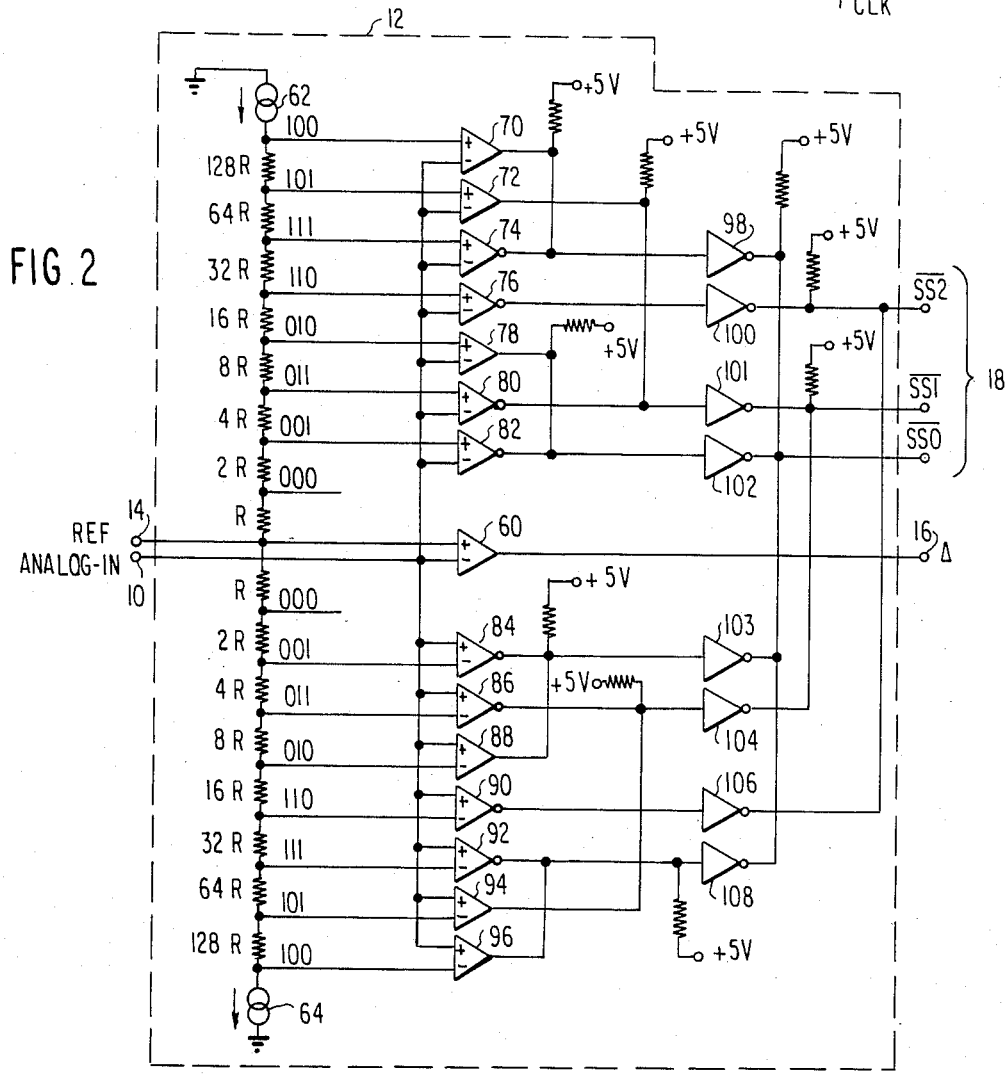
FIG. 2 is a schematic diagram of a flash logarithmic comparator as used in this invention.

In FIG. 2, there is shown a detailed schematic of an example of a logarithmic converter, specifically a logarithmic flash A/D converter. A delta converter 60 has the analog input terminal 10 connected to its inverting input and the reference terminal 14 connected to its non-inverting input. The output of this converter is the delta signal which is output on terminal 16. If this were a standard DM communication system, the converter 12 would have this single output. The various bins of the logarithmic converter 12 are determined by a resistor chain comprising in this case 16 resistors ranging in value from R to 128R. The value of R is fairly arbitrary but must be chosen to yield desirable step sizes and to be consistent with the impedances of the active components of the rest of the converter 12. The resistor ladder is divided into two similar resistors ladders, with the lowest value resistors connected to the reference signal terminal 14. Each succeeding resistor in the ladder has double the resistance of the preceding resistor, hence the name logarithmic comparator. Of course, if the converter 12 is one of the more general companded converters, a similarly companded resistor ladder would be used. The outer ends of the resistor ladders are connected to separate constant current sources 62 and 64 which respectively drive current into and draw current from the sides of the ladder. The effect of the resistor ladder is to provide a logarithmic comparison scale of voltages, logarithmically increasing in magnitude in both the positive and negative direction away from the reference signal. The absolute size of these voltages is determined by the value R and the currents impressed by the current sources 62 and 64.

The comparisons for the various bins are performed simultaneously by fourteen comparators 70-96. All of these comparators have open-collector outputs and comparators 74, 76, 80, 82, 84, 86, 90, and 92 have inverting outputs. The inverting inputs of the upper comparators 70-82 are connected to the analog input signal terminal. The non-inverting inputs of these comparators are connected to the respective interconnection points of the upper part of the resistor ladder, with the point between R and 2R left disconnected. A similar arrangement is made with the lower resistor ladder. However, the inverting and non-inverting inputs of the lower comparators 84-96 are reversed in their connections to the analog input signal and the resistor chain. Additional inverters 98-108, all having open-collector outputs, are used as indicated in FIG. 2 to provide signals of the correct polarity.

Because of the open-collector outputs, and the additional use of pull-up resistors connected to +5V, the outputs of two comparators or inverters can be combined. A combination of such signal produces a one only if both signals so connected are both ones; otherwise, a zero is produced for any combination having a zero. With the interconnections indicated in FIG. 2, the output terminals 18 are the binary outputs of the log flash converter and indicate the magnitude of the difference between the analog input signal and the reference signal. These terminals carry a complemented Gray code for the position of the analog input signal on either part of the resistor ladder. The lines connecting the resistor ladder to the comparators is marked with the Gray code element. The indicated combination of inverters 98-108, inverting outputs of the comparators 70-96, and the interconnecting lines perform the conversion to Gray code version of binary code. What has been described is a flash A/D converter because all the comparisons are being simultaneously performed.

Obviously, other companding scales could be used for the resistor ladder rather than the logarithmic scale indicated. Furthermore, converters 12 having greater or lesser numbers of converters and, as a result, differing numbers of output lines 18 can be built by similar techniques.

The logarithmic delta demodulator will now be described in further detail in the schematic of FIG. 3. The transmitted delta signal 24 controls a 2-to-1 switch 120, also called a multiplexer. The two inputs 122 and 124 of the multiplexer 120 are connected respectively to +15V and -15V. Depending upon the value of the transmitted delta signal 24, one of these two voltages is switched to the output line 126 which in turn is connected to an input of a 1-to-8 switch, also called a demultiplexer, which directs the signal on line 126 to one of eight output lines dependent upon the value of the parallel transmitted step size signal connected to its three control inputs. A series of logarithmically sized resistors connected individually to the eight outputs arranged in Gray code of the 1-to-8 switch 128 is connected in common on the other side of the resistors. This common point is then connected to the inverting input of an operational amplifier 130 while the non-inverting input is connected to ground. The output of the operational amplifier 130 is connected to the output terminal 44 of the logarithmic delta demodulator 42. A capacitor is connected between this output and the inverting input of the operational amplifier 130. Because the inverting input acts as virtual ground, the logarithmic series of resistors provides a logarithmic series of current sources. The magnitude of the current is determined by the transmitted step size signal and the polarity of the current is determined by the transmitted delta signal 24. The combination of operational amplifier 130 and feedback capacitor 132 acts as an integrator to integrate current over time. Thus, while the delta transmission line 24 and the step size transmission line 40 are providing incremental values of the signal, i.e. what the current polarity and size of the step are, the output terminal 44 is carrying an analog signal representative of the absolute amplitude of the analog input signal of the delta modulated communication system. Of course this signal on the output 44 may differ because of noise quantization and time lag from the two analog input signals. The choice of the value of R for the logarithmic delta demodulator and the choice of the value of the capacitance for capacitor 132 must be carefully chosen taking into account the clock rate so that the original analog input signal is regenerated without any amplification or attenuation. The design of the delta demodulater 12 can be easily generalized for any companded scale used in the comparator 12.

Figure 3:
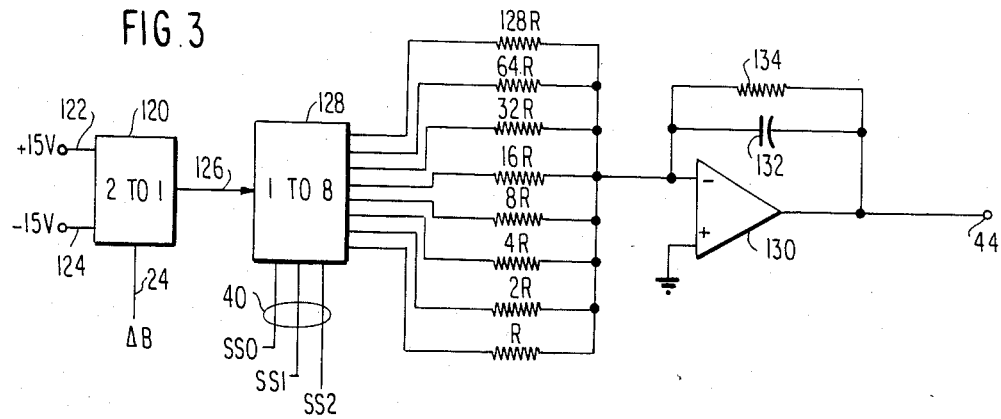
FIG. 3 is a schematic diagram of a logarithmic delta demodulator.

It should be mentioned at this time that the logarithmic delta demodulator shown in FIG. 3 is also used at the receiving station of a companding delta modulated communication system to derive the desired analog signal at the output terminal 44 from the received digital signals on lines 24 and 40. However, in receiver application it is normal to place a leakage resistor 134 across the feedback capacitor 132.

Figure 4:
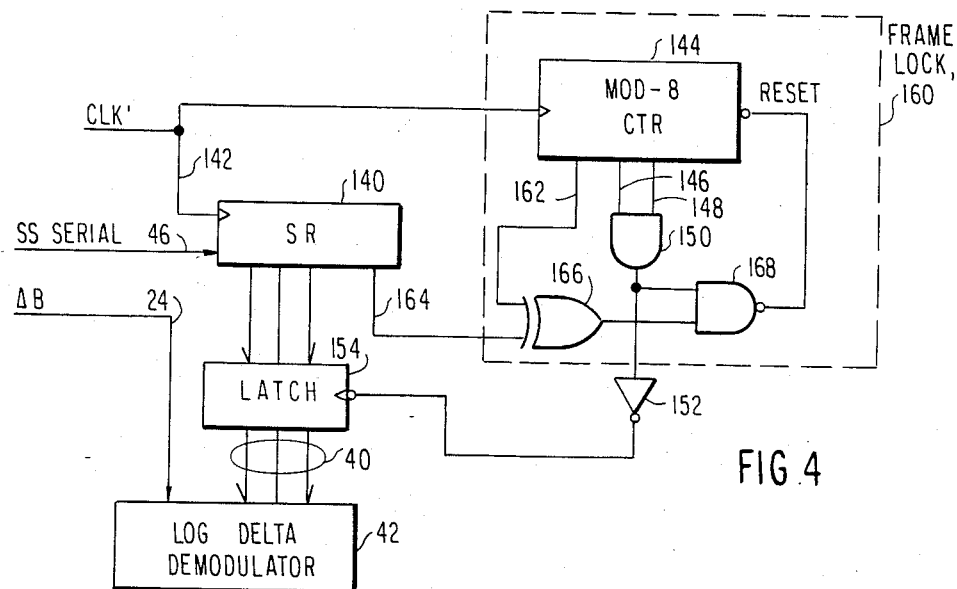
FIG. 4 is a block diagram of an embodiment of a delta modulated receiving station of the present invention.

The apparatus which has been described up to this point is included in the transmitter side of the companding delta modulated communication system of this invention. The design of the receiving section of such a communication system is dictated by the transmitter design. Such a receiver will be described with reference to the schematic shown in FIG. 4. The step-size serial line 46 and the transmitted delta signal line 24 will be assumed to be the same signal line as shown in FIG. 1, although it is to be understood that several operations may have been performed upon the signals on both these lines before, during, and after transmission. The step-size serial line 46 is connected to the data input of a four-bit shift register 140 which is clocked by a clock line 142. It is possible that this clock line 142 is driven by the same clock that drives clock line 20 in FIG. 1; however, for most communication systems the clock signal is derived from the data stream itself. In this case it is necessary that the clock signal be synchronized so that the step clocks of the transmitter and receiver are in phase. A frame lock which guarantees this synchronism will be described later. For the present, it will be assumed that the clock signal is in synchronism with the step-size serial signal 46 and the transmitted delta signal 24.

The clock line 142 is also connected to the clock input of a modulo-8 counter 144 that performs the same function as a corresponding counter 26 in FIG. 1. The two low order output lines 146 and 148 of this counter are connected to the inputs of an AND-gate 150 which will thus produce a pulse once for every four cycles of the clock signal line 142. The output of the AND-gate is connected to an inverter 152 which in turn is connected to the inverting enable gate of a three-bit latch 154. The data inputs of the latch 154 are connected to the last three data outputs of the shift register 140. Thus, every four clock cycles three new bits of step-size data are latched. It will be remembered that every fourth bit in the step-size serial signal 46 is a sync bit which is of importance only for the frame lock. The outputs of the latch are connected to a logarithmic delta demodulator 42, which is of identical or similar design to the demodulator 42 of FIGS. 1 and 2. The transmitted delta signal 24 is also connected to an input of the logarithmic delta demodulator 42 which thereby produces an analog signal on its output 44 which as far as the receiver is concerned is the current value of the analog input signal 10.

A frame lock 160 can be implemented which overcomes many of the difficulties of synchronizing the clocks at the transmitter and the receiver but which relies upon alternating ones and zeroes in every fourth bit of the step size serial signal. At count 3 and count 7 of the modulo-8 counter 144, the output of the AND-gate is positive, indicating that the step-size serial signal is properly positioned in shift register 140. This also implies that the sync bit is positioned in the shift register 140 at the output that is not connected to the latch 154. If it is assumed that the modulo-8 counter 144 of the receiver is properly synchronized with the modulo-8 counter 26 of the transmitter, then on count 3 of counter 144, the sync bit in the shift register 140 is zero. On the other hand, at count 7, the sync bit will be a one. If this is the case, then the high order output line 162 of the counter and the sync bit line 164 of the shift register 140 will both output a zero on count 3 and a one on count 7. Both these lines are connected to the inputs of an exclusive-OR gate 166 which, in these circumstances, will be outputting a zero on both count 3 and count 7. The output of the exclusive-OR gate 166 is connected to an input of an NAND-gate 168, the other input of which is connected to the output of the AND-gate 150. In the aforementioned circumstances, only on counts 3 and 7 is the output of AND gate 150 a one and for these counts, the output of the exclusive-OR gate 166 is a zero. Therefore the output of the NAND gate 168 is always a one. This output is connected to an inverted reset terminal of the counter 144 but in the aforementioned circumstances, the reset is never activated. However, if on count 3 or 7, it is detected that the proper sync bit is not in the step size serial signal, then the output of the NAND gate goes to a zero and the counter 144 is reset to zero, from which point it begins counting at the rate of the clock signal line 142. Of course if the counter 144 is still not in synchronism, on subsequent counts it will be again reset until the proper synchronism is obtained.

Figure 5:
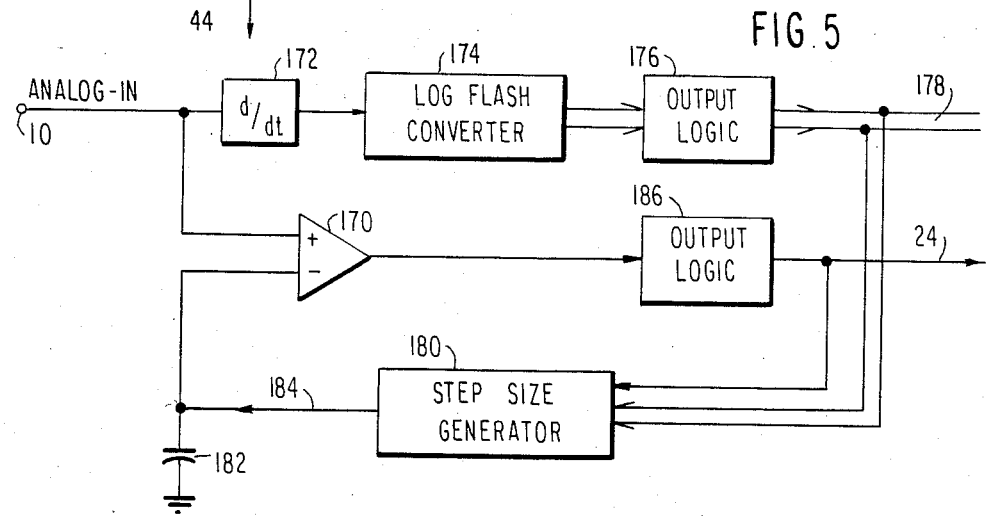
FIG. 5 is a block diagram of another embodiment of a delta modulated transmitting station of this invention.

An alternative embodiment of the transmitter will now be described with reference to the block diagram shown in FIG. 5, The analog input signal terminal 10 is connected both to a comparator 170 and to a differentiating circuit 172. The output of the differentiating circuit 172 is connected to the input of a logarithmic flash converter 174 similar in construction to the logarithmic flash converter of FIG. 2 except that the reference voltage is always zero. The binary output signals of the converter 174 are connected to a first output logic system 176 which performs the proper sampling before outputting a transmitted step size signal on the parallel step size transmission line 178. The time differentiator 172 forms an estimate as to how quickly the analog input signal is changing and this estimate is used for the step size. In this respect, the embodiment of FIG. 5 differs from that of FIG. 1 in that the step size is computed without reference to a reconstructed transmitted signal.

The transmitted digital signal is reconstructed by connecting the step size transmission line 178 to a step size generator 180, similar to the logarithmic delta demodulator 42. However, the integrating capacitor 182 is explicitly shown connected to the analog output line 184 of the generator 180. This line is also connected to the inverting input of the delta comparator 170 and contains the reconstructed analog signal. The output of the delta comparator 170 is connected to a second output logic system 186 which performs the clocking operations as previously described for the embodiment of FIG. 1. Its output is connected to the delta transmission line 24 which is also used as an input for the step-size generator 180.

The invention as described is a modification of a delta modulation communication system which provides the ability to quickly adjust to large changes in amplitude of the analog input signal. To obtain this capability, additional bandwidth is required for the transmitted step-size signals. In the example described, the bandwidth needs to be doubled. The use of a companded or logarithmic converter provides for large amplitude changes at relatively small bandwidths. Finally, an entire companding delta modulator communication system can be built with relatively simple inexpensive circuitry, with low precision and accordingly inexpensive components, and is amenable to semiconductor integration. At the same time, relatively high fidelity of the transmitted audio signal can be attained.

I claim:

1. A digital communication system for an analog signal, comprising:
    a companded A/D converter (12) for comparing said analog signal against a reference signal, said companded converter comprising a flash converter including a plurality of comparators (70-96) each receiving said analog signal and a signal derived from said reference signal, said converter outputting a step-size signal indicating the magnitude of the difference between said analog signal and said reference signal and a delta signal indicating the sign of said difference, said step size being companded, with the smallest step size associated with the smallest difference;
    a clock outputting a clock signal (20) at a clock rate;
    delta data selection means (22) receiving said clock signal and said delta signal for outputting a digital transmitted delta signal at a clock rate;
    a step clock (26, 34) connected to said clock and outputting a step clock signal at a step clock rate that is a predetermined subharmonic of said clock rate;
    step data selection means (38) receiving said step-size signal for outputting a digital transmitted step-size signal at the step clock rate;

a companded delta demodulator (42) receiving said transmitted delta signal and said transmitted step-size signal for outputting an analog transmitted amplitude signal determined by the present and past transmitted delta and step-size signals, said transmitted amplitude signal being used as said reference signal.

2. A digital communication system, as recited in claim 1, further comprising a multiplexer for multiplexing said transmitted delta signal and said transmitted step-size signal into a serial signal and a receiving station for receiving said serial signal comprising a demultiplexer of said serial signal and a delta companded demodulator connected to said demultiplexer.

3. A digital communication system, as recited in claim 1, wherein the companded step sizes are logarithmic step sizes.

4. A digital communication system, as recited in claim 1, further comprising a multiplexer (48) receiving said digital transmitted step size signal and outputting a serial step-size signal.

5. A digital communication system, as recited in claim 4, further comprising a synchronizing circuit (26), controlled by said clock signal, for outputting a given sequence of digital signals and wherein said multiplexer receives said sequence for outputting it as part of said serial step-size signal.

6. A digital communication system, as recited in claim 1, further comprising a receiving station (FIG. 4) receiving said transmitted delta signal and said transmitted step-size signal, said receiving station comprising a companded delta demodulator (42).

7. A digital communication system, as recited in claim 4, further comprising a receiving station receiving said transmitted delta signal and said serial step-size signal, said receiving station comprising a demultiplexer (140) for demultiplexing said serial step-size signal and a companded delta demodulator (42) connected to said demultiplexer.

8. A digital communication system, as recited in claim 5, further comprising a receiving station receiving said transmitted delta signal and said serial step size signal, said receiving station comprising:
- a local clock signal (142);
- a frame locking circuit (160) for synchronizing said serial step-size signal with said local clock signal;
- a demultiplexer (140) for demultiplexing said serial step-size signal; and
- a companded delta demodulator (42) connected to said demultiplexer.

* * * * *